Figure 1:
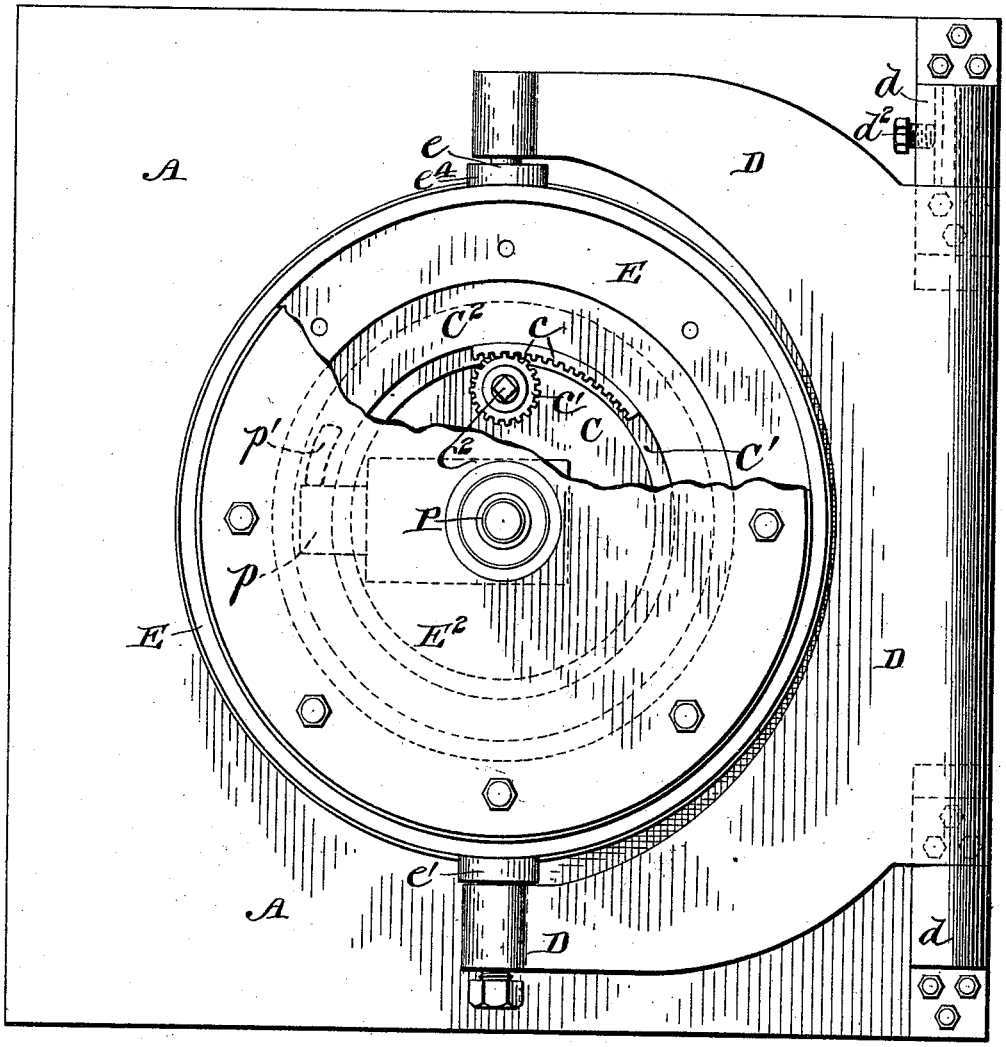

(No Model.) 9 Sheets—Sheet 1.

T. M. BRINTNALL.
SAFE.

No. 562,277. Patented June 16, 1896.

Witnesses
Inventor
Thomas M. Brintnall
by Mason, Fenwick and Lawrence
his Attorneys (No Model.) 9 Sheets—Sheet 2.
T. M. BRINTNALL.
SAFE.
No. 562,277. Patented June 16, 1896.
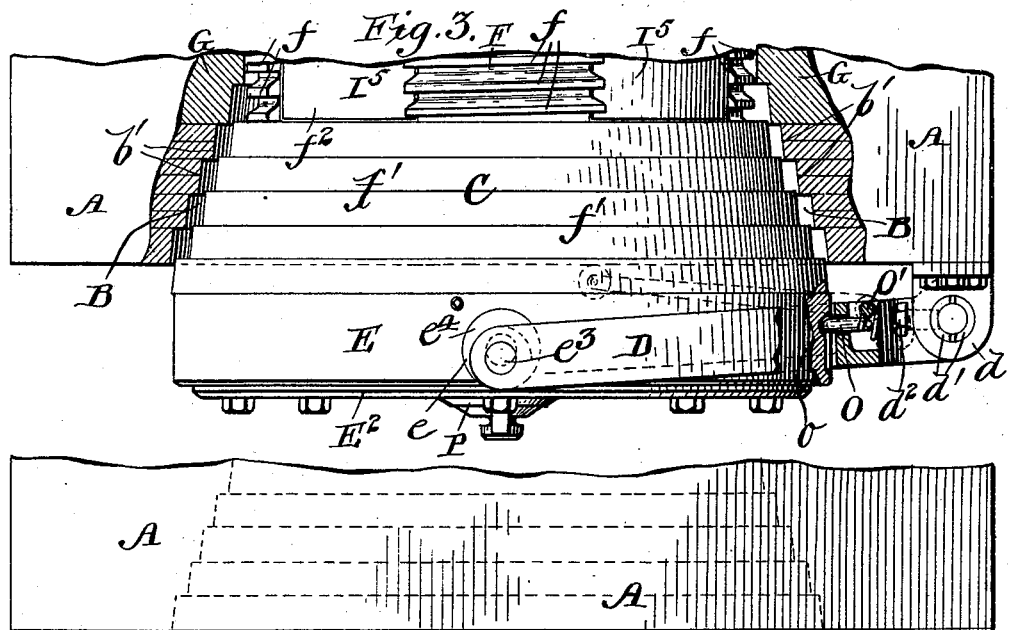
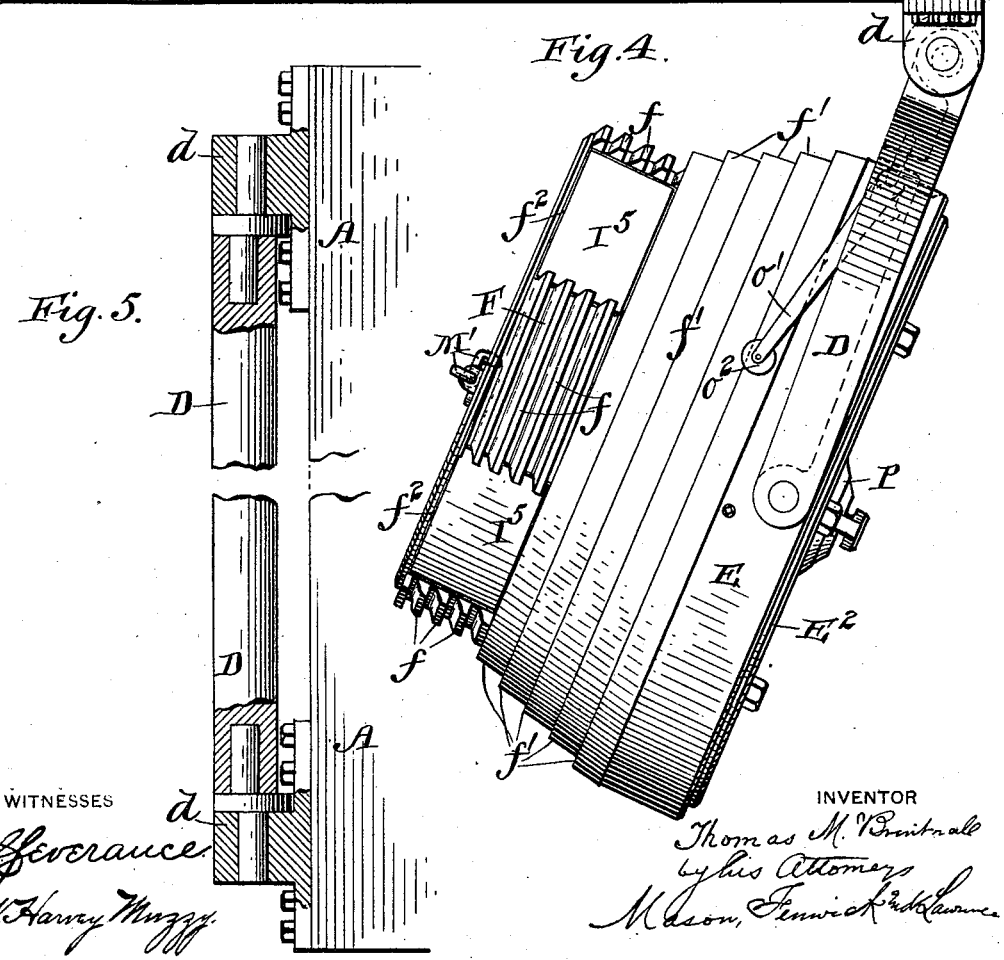
WITNESSES
Severance
W. Harry Muzzy
INVENTOR
Thomas M. Brintnall
by his Attorneys
Mason, Fenwick & Lawrence (No Model.) 9 Sheets—Sheet 3.
T. M. BRINTNALL.
SAFE.
No. 562,277. Patented June 16, 1896.
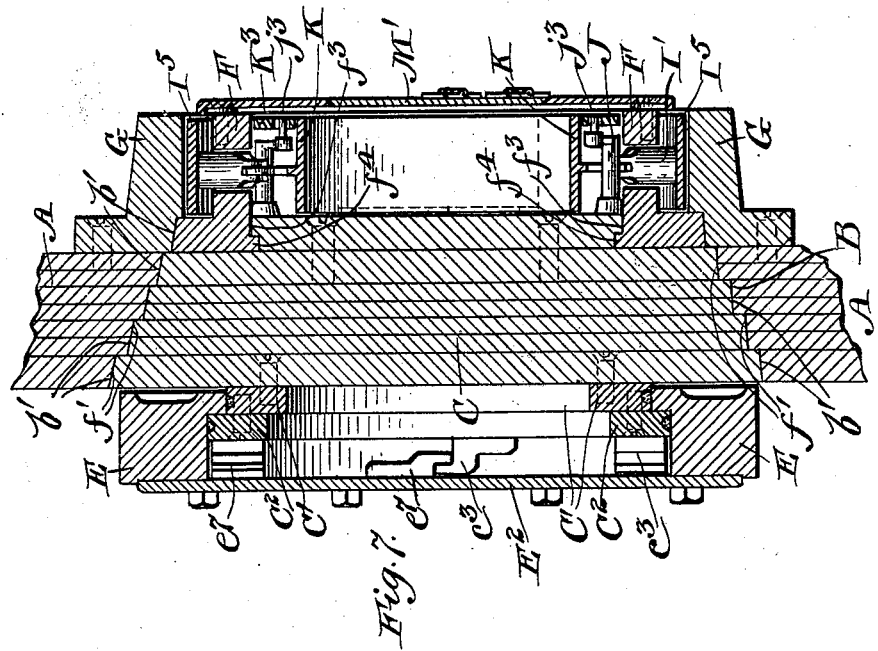
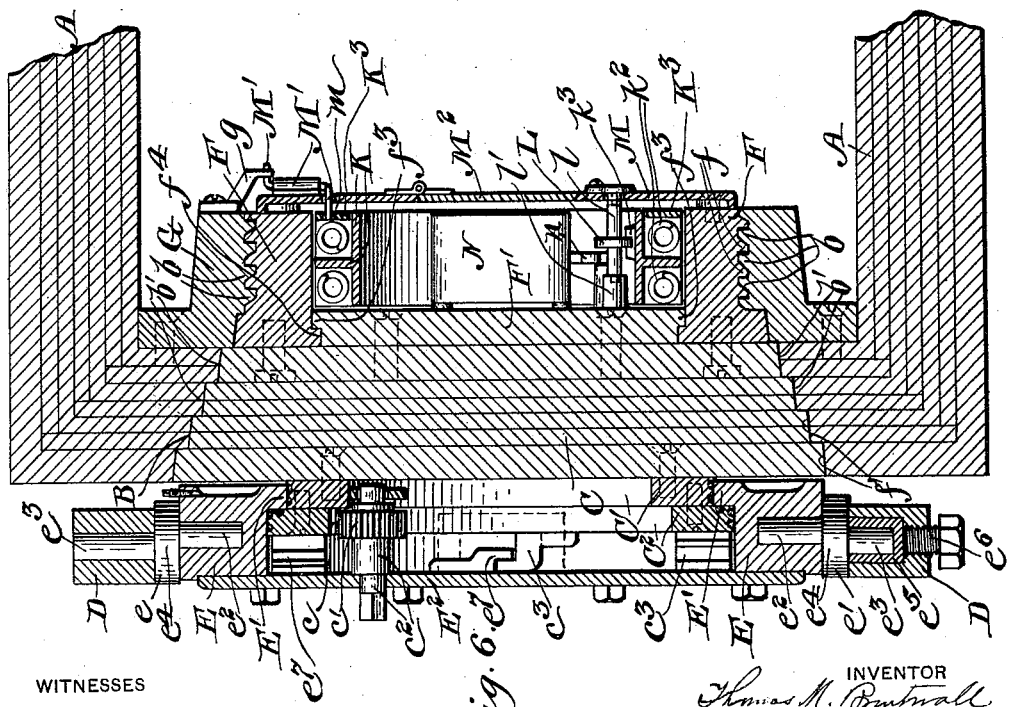
WITNESSES
INVENTOR (No Model.)  9 Sheets—Sheet 4.
T. M. BRINTNALL.
SAFE.
No. 562,277.  Patented June 16, 1896.
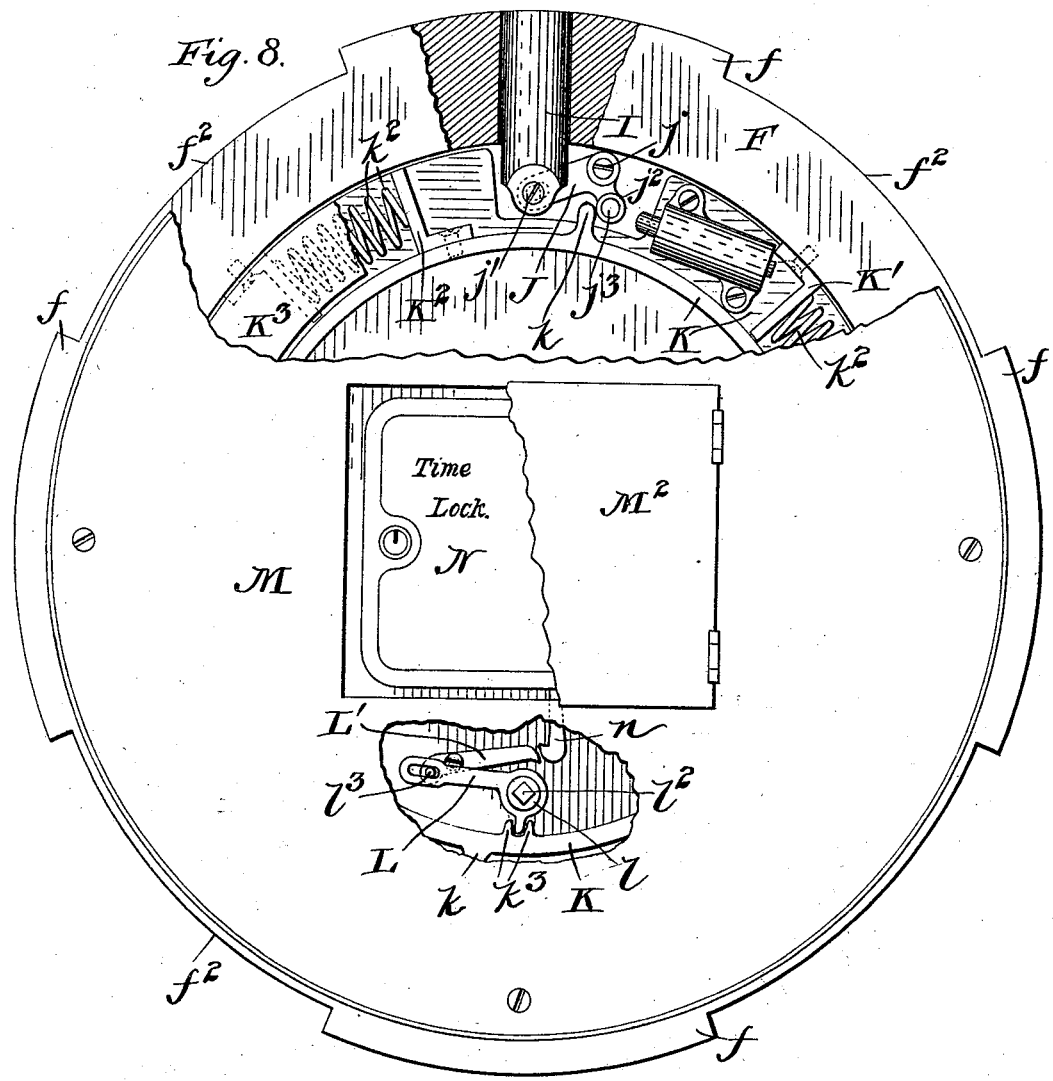
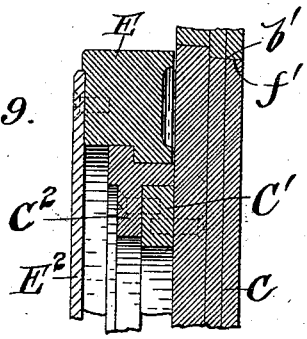
WITNESSES:  INVENTOR.
Thomas M. Brintnall
BY
his
ATTORNEYS (No Model.)  9 Sheets—Sheet 5.

T. M. BRINTNALL.
SAFE.

No. 562,277. Patented June 16, 1896.

Witnesses
Inventor
Thomas M. Brintnall
by Mason Fenwick & Lawrence
his Attorneys (No Model.) 9 Sheets—Sheet 6.
T. M. BRINTNALL.
SAFE.
No. 562,277. Patented June 16, 1896.
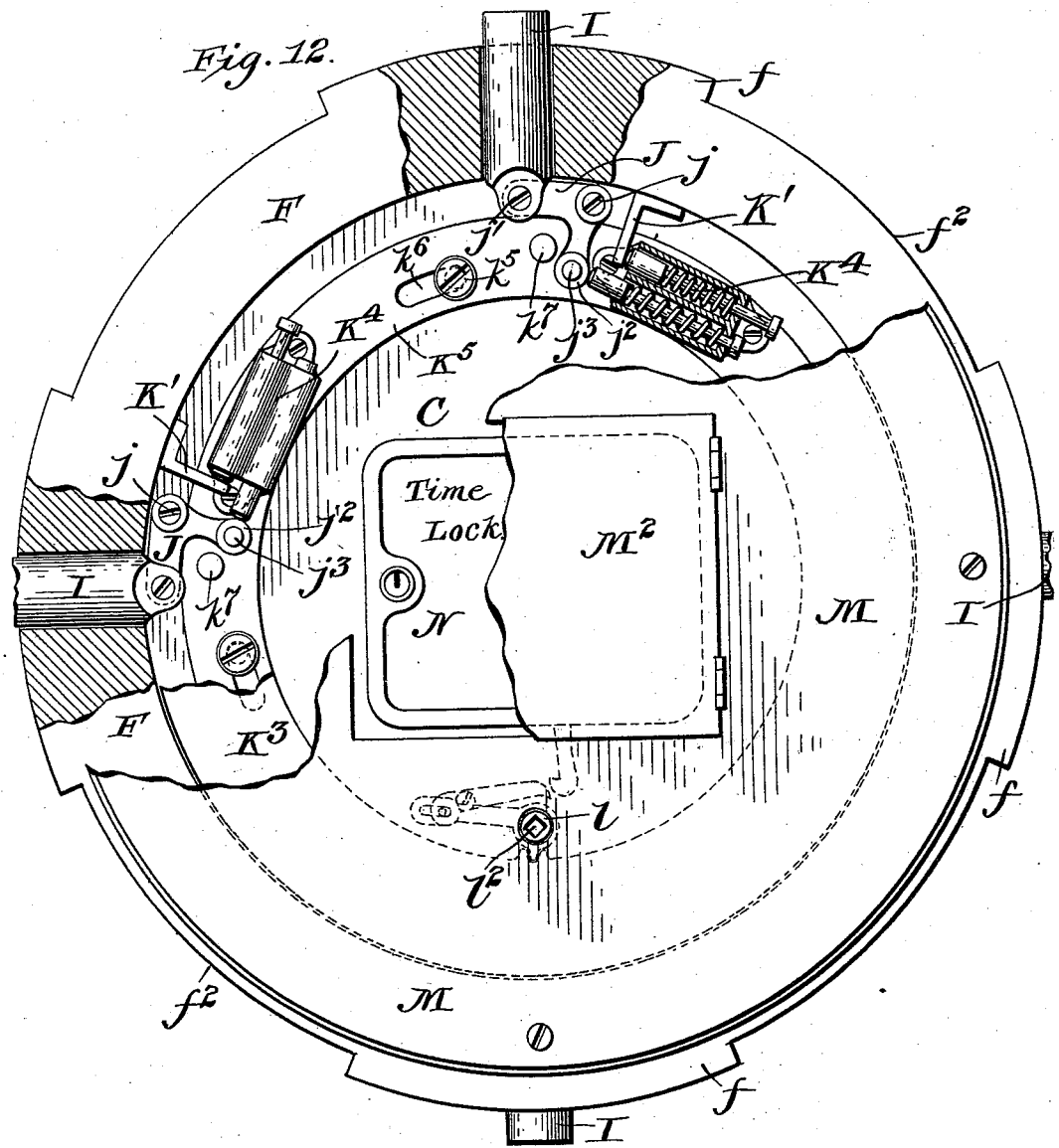
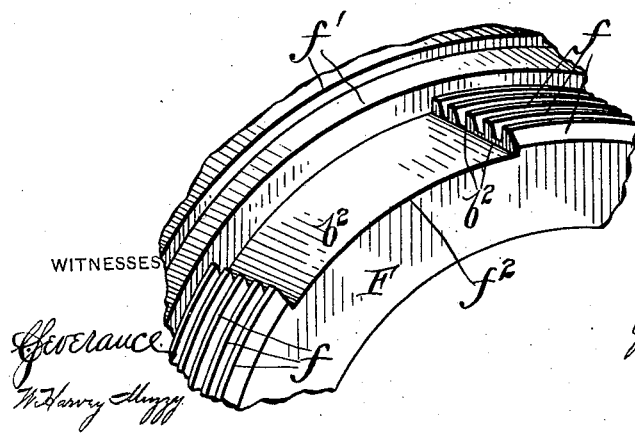
WITNESSES
INVENTOR
Thomas M. Brintnall
by Mason Fenwick Lawrence
his Attorneys (No Model.) 9 Sheets—Sheet 7.
T. M. BRINTNALL.
SAFE.
No. 562,277. Patented June 16, 1896.
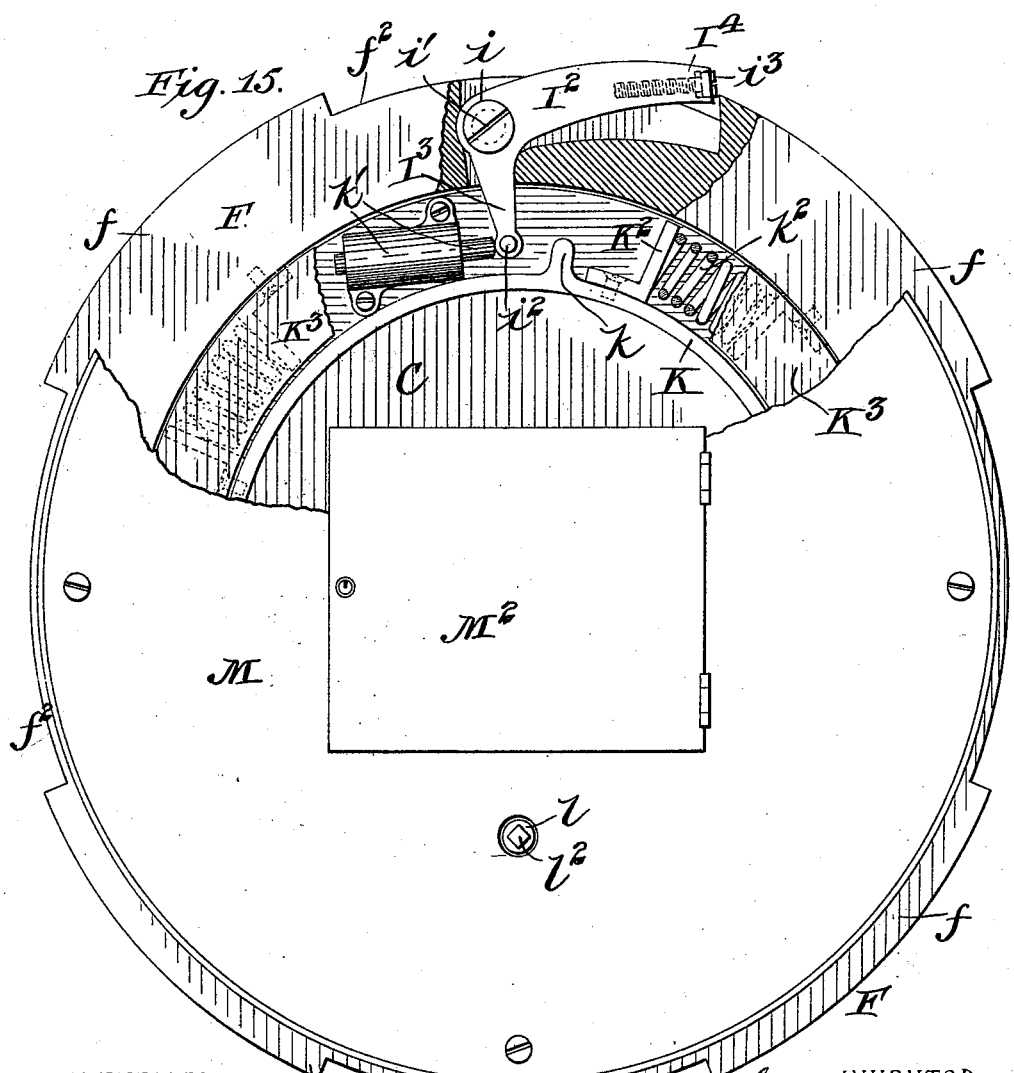

(No Model.) 9 Sheets—Sheet 8.
T. M. BRINTNALL.
SAFE.
No. 562,277. Patented June 16, 1896.
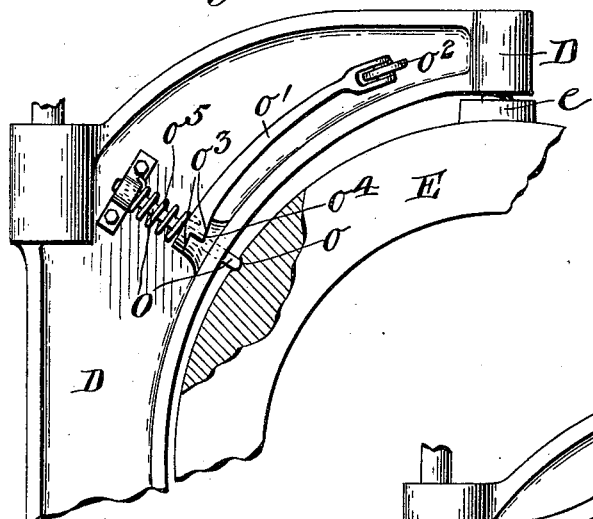
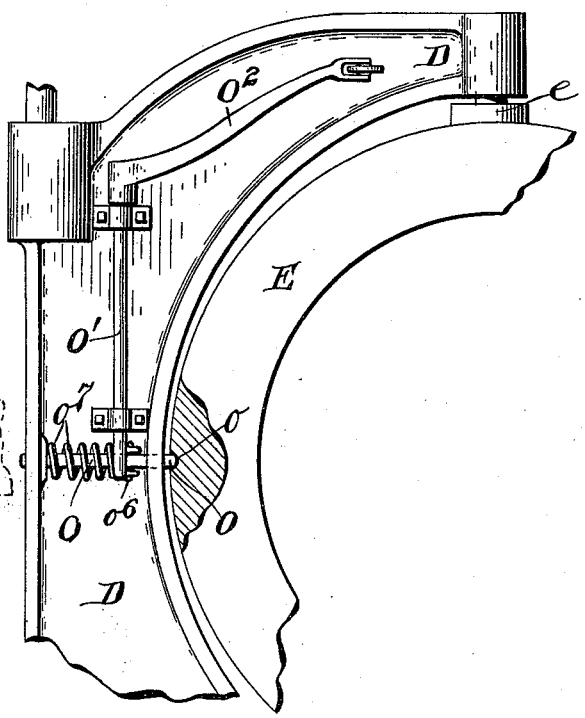
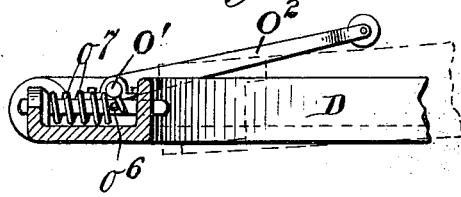
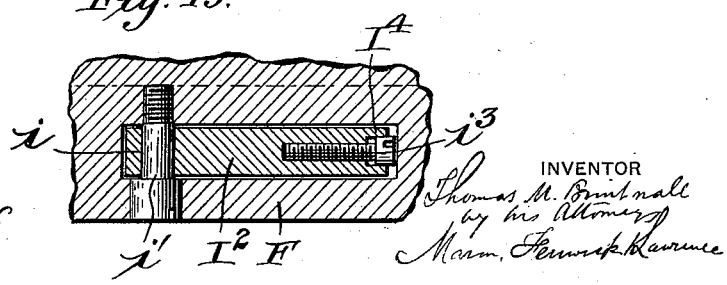
WITNESSES
INVENTOR
Thomas M. Brintnall
by his Attorneys (No Model.)  T. M. BRINTNALL.  9 Sheets—Sheet 9.
SAFE.

No. 562,277.  Patented June 16, 1896.

WITNESSES  INVENTOR

UNITED STATES PATENT OFFICE.

THOMAS M. BRINTNALL, OF MEDINA, OHIO.

SAFE.

SPECIFICATION forming part of Letters Patent No. 562,277, dated June 16, 1896.

Application filed February 14, 1895. Serial No. 538,361. (No model.)

*To all whom it may concern:*

Be it known that I, THOMAS M. BRINTNALL, a citizen of the United States, residing at Medina, in the county of Medina and State of Ohio, have invented certain new and useful Improvements in Safes for Banks and other Uses; and I do hereby declare the following to be a full, clear, and exact description of the invention, such as will enable others skilled in the art to which it appertains to make and use the same.

My invention relates to safes having circular apertures for circular doors and are provided with doors that swing on hinges; and its object is to provide such safes with doors having improved mutilated-screw holding devices in combination with suitable shouldered stepped portions, the apertures in the safes being provided with corresponding screw and shouldered portions to receive the said doors and also to provide such safes with suitable bolts and bolt-operating mechanism internally of the circular door for automatically securing said doors against rotation.

It is also the object of my invention to provide an improved bolting mechanism inclosed in said circular door, such that should an obstruction of any kind accidentally prevent the full throw of any of the bolts they can still be retracted at the proper time without the danger of a lock-out.

There are other objects as will appear in the body of the specification.

With these objects in view my invention consists in certain novel constructions and combinations of parts, as will be fully disclosed in the specification and claims and shown in the drawings.

Figure 2:
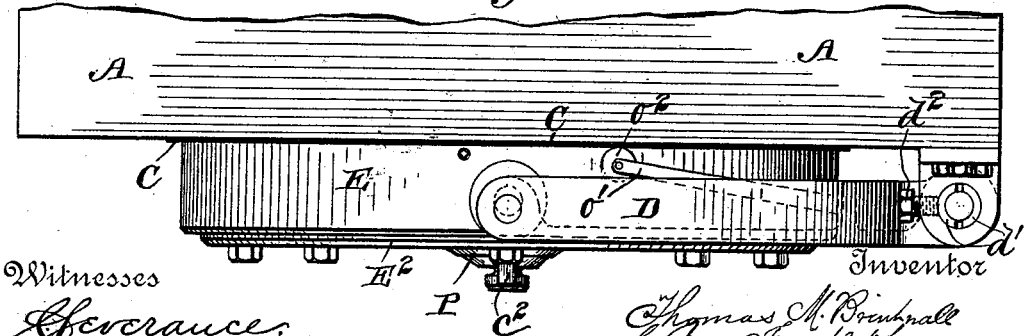
Figure 10:
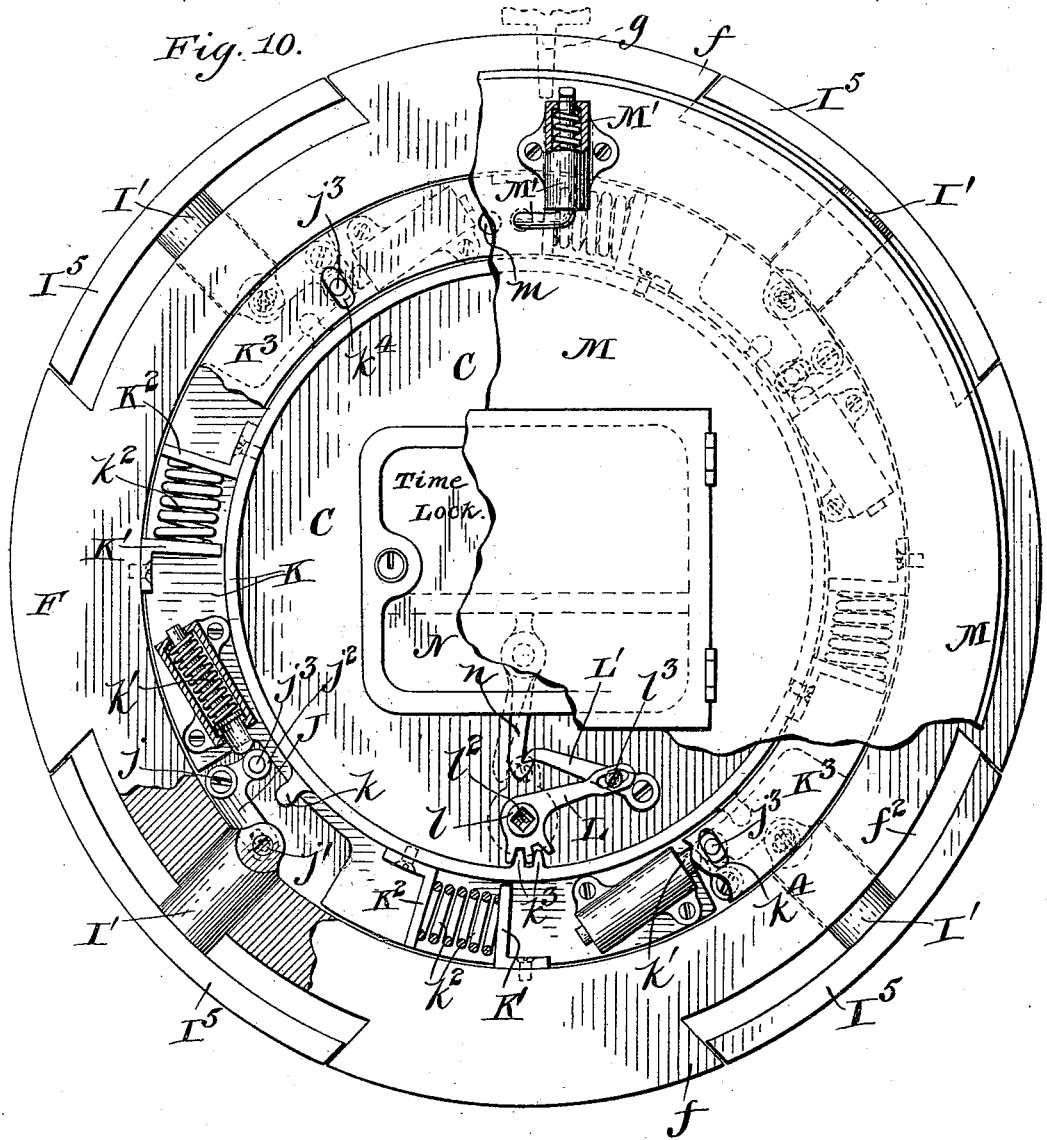
Figure 11:
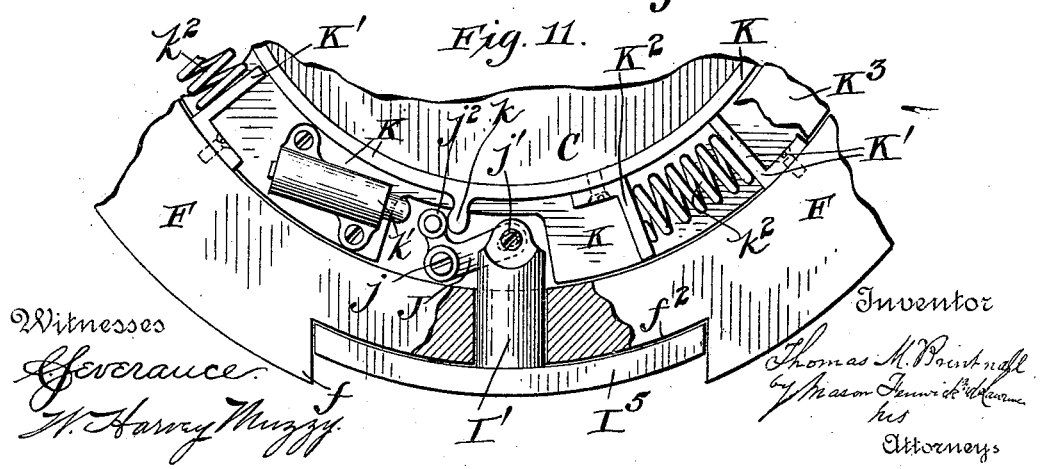
Figure 20:
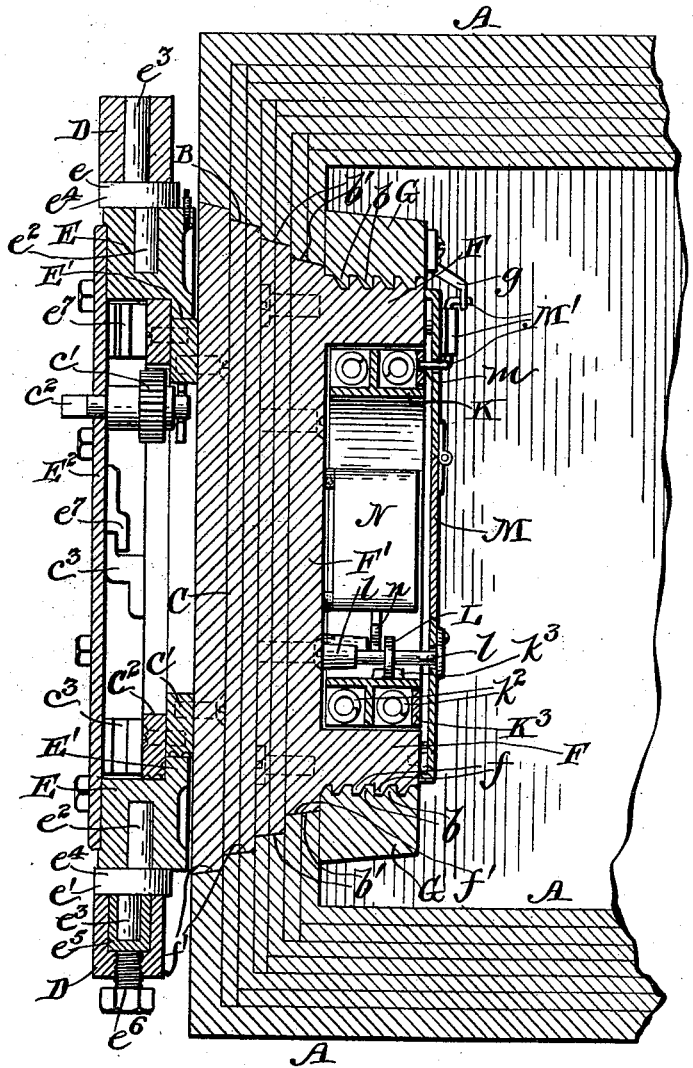

In the accompanying drawings, Figure 1 represents a front elevation of a safe provided with my improved circular door, part of the front plate of said door being broken away to show the mechanism for rotating the door. Fig. 2 is a broken top plan view of a portion of the safe and its door. Fig. 3 is a broken top plan view of a portion of the safe and the circular door when almost in its closed position, showing means for guiding it into position without injuring the jambs of the circular doorway. Fig. 4 is a broken top plan view of a portion of the safe and the circular door, it being swung out and back upon its hinge. Fig. 5 is a broken detail view, partially in section, showing a slightly-different construction of the hinge of the door. Fig. 6 is a vertical central sectional view of the door and a portion of the safe. Fig. 7 is a central sectional view of the door, taken upon the line of two of its locking-bolts. Fig. 8 represents a rear elevation of a portion of the circular door, the rear cap-plate being broken away to show the bolt-operating mechanism and time-lock. Fig. 9 is a detail sectional view of a part of the circular door, showing the rings which secure it to the hinge. Fig. 10 represents a rear elevation of a part of the circular door, showing more clearly the bolt controlling and operating mechanism and a little different form of locking-bolt. Fig. 11 is a detail view of a portion of the same, showing the bolt in its retracted position. Fig. 12 is a view similar to Fig. 8, but showing a different construction of the bolt-operating mechanism. Fig. 13 is a detail perspective view of a portion of the mutilated screw of the door and showing the slight taper of the space between the screw-segments. Fig. 14 is an elevation of the mutilated portion of the circular door, showing the bolt proper in the form of a latch. Fig. 15 is a rear elevation of the circular door, parts being broken away to show the form of the latch shown in Fig. 14. Fig. 16 is a detail elevation of a portion of the door-hinge, showing an improved means of holding the door, so that it will not injure the jambs of the doorway when swung into its closed position. Fig. 17 represents a detail view of a different form of the door-controlling device. Fig. 18 represents a detail sectional view of the device shown in Fig. 17, and Fig. 19 represents a detail sectional view showing the pivot and means for taking up wear of the form of latch shown in Figs. 14 and 15. Fig. 20 is a vertical sectional view of the door and a portion of the safe, illustrating a different arrangement of the mutilated female screw.

In the drawings, A represents a safe, B a circular aperture or doorway, and C a circular door.

D is a hinge carrying the door C; E, a ring pivoted to the hinge D and carrying the door in such a way that it may be rotated in said ring.

F is a mutilated male screw portion upon the door C; G, a mutilated female screw secured to the safe, and I are locking-bolts.

The safe A is constructed of suitable material and of rectangular or any other desirable shape and has the circular front opening or doorway B, adapted to receive the circular door C when it is swung into its closed position. The swinging hinge D, carrying the ring E and door C, is provided with pintles having bearings in brackets $d\,d$ upon the front of the safe A. In order to take up any wear in the bearings of the hinge, I preferably provide the upper bracket $d$ with half-socket bearings $d'$, within which the pintle of the hinge D is journaled and a screw $d^2$, engaging threads in the bracket and bearing with its end upon one of the half-socket bearings. By this means the hinge can be adjusted to carry the door accurately into its proper place.

The ring E, carrying the door, may be pivoted to the swinging hinge in an ordinary way, but I prefer to use an eccentric hinge-bearing, as shown in the drawings. These hinge-bearings $e\,e'$ each have two pintles $e^2$ and $e^3$, and the pintles $e^2$ of which are journaled in the ring E and pintles $e^3$ in the hinge D. The pintles $e^2$ and $e^3$ are arranged on each side of a central enlarged portion $e^4$ of the hinge-bearings and eccentrically with relation to each other and to the central axis of the hinge-bearings. The use of these improved eccentric bearings greatly facilitates the easy and accurate closing of the door. The pintle $e^3$ of the lower bearing $e'$ works in a bearing-socket $e^5$ in the hinge D, which is adapted to be adjusted by a screw $e^6$, and any wear on the parts may also be taken up by the said screw $e^6$. The eccentric hinge-bearings may be used in hanging the hinge to the front of the safe, as shown in Fig. 5, if desired, instead of being used in pivoting the ring E to the hinge, as just described.

The ring E is made of sufficient dimensions to secure the required strength and is provided with an inwardly-extending annular flange E', forming a bearing for the door C. The door C is formed of suitable plates and the male mutilated screw F, bolted together to form a door of great strength. To the front of the door is fastened a ring C', bolted to the front plate of the door, preferably from the rear, so that the screw-bolts are not exposed anywhere. Another ring $C^2$, of a little larger diameter, is bolted securely to the front of the ring C' and engages the annular flange E' of the ring E.

It will be seen that by this construction the circular door C has a bearing in the ring E through its rings C' $C^2$, so that while being snugly and securely held and carried by the ring E and hinge D, yet it is free to be rotated when it is desired. The rings C' $C^2$ are preferably made of phosphor-bronze and may have their bearing-surfaces studded with small drill-holes filled with plumbago to act as a lubricant.

To the inner surface of the ring $C^2$ is secured a toothed segment $c$, adapted to be engaged by a cog-pinion $c'$ upon a shaft $c^2$, having suitable bearings in a cap-plate $E^2$, which is bolted or otherwise secured to the front of the ring E. The outer end of the shaft $c^2$ is squared to receive a handle of any kind by which it may be turned. By turning the shaft $c^2$, the pinion $c'$ engages the toothed segment $c$ and the circular door is caused to rotate in one direction or the other according as the handle may be turned. The cap-plate $E^2$ serves to cover all the mechanism on the front of the door, and in addition to securing it in place by bolts, it is desirable to fasten it in a way that cannot be reached from the outside. To accomplish this, the lugs $c^3$ are secured to the front of the ring $C^2$ in such a manner as to engage corresponding lugs $e^7$, secured to the inner face of the cap-plate $E^2$, when the door is in its locked position. When the door is rotated into its unlocked position, the lugs $c^3$ and $e^7$ will become disengaged and the cap-plate can be removed if it should be found necessary. But when the door is rotated into its locked position the lugs $c^3$ and $e^7$ will be engaged, and although the bolts be removed from the cap-plate $E^2$, the said plate will be held securely in place by the lugs.

The door proper, C, is preferably made up of plates of gradually-decreased diameter and the male mutilated screw F, of suitable material, all securely bolted together, so that the periphery of the door presents for a portion of its width a series of annular shoulders $f'$ and for the remainder of its width a plurality of screw-segments $f$, which are preferably in series, separated by the interrupted portions $f^2$ of the mutilated screw F. The inmost shoulder $f'$ is preferably formed upon the male mutilated screw F, which is made in ring form and incloses the bolt locking mechanism. The male screw F, besides being fastened to the rest of the door by screw-bolts, is still more securely held by a plate F', having a flange $f^3$, which engages an inwardly-extending flange $f^4$, upon the male screw-ring F, the said plate F' being screw-bolted to the rest of the door. It will be seen that by this construction the mutilated male screw F is interlocked with and held in place partially by the platework of the safe front and door, its shouldered portion being wedged in between the plate F' and the base portion of the mutilated female screw G, which, as shown in the drawings, forms the inmost plate of the safe-front. The base portion of the mutilated female screw G with its jamb $b'$ may be dispensed with and the shoulder $f'$ of the male screw F be brought against the inmost joint $b'$ of the other plates of the safe-front, as shown in Fig. 20 of the drawings, which will also effect a very strong interlocking or dovetail-like joint.

If desired, the mutilated male screw-ring F and the plate F' may be cast in one solid piece, which would make a very strong construction.

The door-opening B is formed in the plates of the safe-front and in the mutilated female screw-ring G, firmly bolted to the safe-front, and is provided with a series of stepped jambs $b'$ to receive the shoulders $f'$ of the door C and a plurality of screw-segments $b$, which are preferably in series to receive the screw-segments $f$ of the mutilated male screw F, so that when the circular door C is swung into place, it being in such a position that the screw-segments $f$ of the mutilated male screw F will register with the interrupted spaces of the mutilated female screw G, by giving the door a partial rotation the male screw-segments $f$ will engage the female screw-segments $b$, and the shoulders $f'$ will be very closely and snugly seated in the jambs $b'$. In this way the door C is secured in place in such a way that it is impossible to move it in or out and such a tight joint of irregular or labyrinthian shape is formed that it is impossible to introduce explosives of any kind.

To facilitate the opening and closing of the door, the interrupted portions of the mutilated male and female screws may be slightly tapered, as shown in Fig. 13 at $b^2$. In order to prevent the rotation of the door C after it has been closed and the screw-segment been brought into engagement, a series of bolts is used the mechanism for operating and controlling which is located within the mutilated male screw-ring F.

Bolts I, Figs. 8 and 12, are adapted to be shot in and out through apertures in the male screw-ring F, passing through the screw-segments $f$, and engage suitable openings in the female screw G. Bolts I', Figs. 7, 10, and 11, are adapted to be shot through apertures in the male screw F, passing through the interrupted portions $f^2$ of said screw, and are provided with segmental heads $I^5$, of sufficient length to occupy the space between the screw-segments, so that when the door is closed and the bolts I' are shot, the bolt-heads $I^5$ will extend between the screw-segments of the mutilated female screw G and effectually prevent any rotation of the door until the bolts are withdrawn. The mechanism for controlling these bolts is the same in both instances. Bell-crank levers J are pivoted to the door at $j$ and are provided with slots in one of their ends in which screws in the inner ends of the bolts I I' are adapted to work, as at $j'$. The other ends $j^2$ of the bell-cranks J are adapted to be engaged and operated one way or the other by projections $k$ and spring-bolts $k'$ upon a sliding ring K, which is held in place and guided by the inner surface of the male screw-ring F. A series of projections K' are secured to the inner surface of the male ring F or fastened to the inner face of the safe-door, and a series of similar projections $K^2$ are secured upon the ring K. Coiled springs $k^2$ are interposed between the projections K' and $K^2$ and normally actuate the ring K, so that the projections $k$ will engage the bell-cranks J and withdraw the bolts, as shown in Figs. 8 and 11. In order to move the ring K in the other direction against the action of the springs $k^2$ and allow the bolts to be shot by the action of the spring-bolts $k'$ against the bell-cranks J, the ring K is provided with teeth or projections $k^3$, which are adapted to be engaged by similar teeth or a projection upon one end of a lever L, having a shaft $l$, journaled at one end in a boss $l'$ (see Fig. 6) upon the door C and at the other end in the rear cap-plate M. This end of the shaft $l$ is provided with a square socket $l^2$, which may be turned by the application of a handle provided with a squared end. The other end of the lever L is slotted and engages a screw or projection $l^3$ upon a lever L', pivoted to the door C at one end, the other end being adapted to engage the notched or hooked end of the lever $n$ of a time-lock N of ordinary construction, located within the male ring F.

A sliding ring $K^3$, inclosed and guided by the inner surface of the male ring F, is located just inside the cap-plate M and is provided with radial slots $k^4$, which engage projections $j^3$ upon the free ends of the bell-cranks J. The ring $K^3$ is also provided with an aperture $m$, which is adapted to be engaged and the ring $K^3$ held stationary, when the bolts are in their withdrawn positions, by a spring puppet or bolt M', secured to the rear cap-plate M. The spring-bolt M' is adapted to be operated by a projection $g$ upon the female screw-ring G to release the ring $K^3$ when the door is closed and rotated into its locked position. When the time-lock N has tripped and the springs $k^2$ have forced the ring K around and caused the projections $k$ to engage the bell-cranks J and withdraw the bolts, the ring $K^3$ will be carried around by the projections $j^3$, and the spring puppet or bolt M' will spring into the aperture $m$, and will hold the bolts in their withdrawn position until after the pressure of the ring K is removed by the setting of the said ring and the time-lock N, and until the door is again closed and rotated into its locked position, at which time the projection $g$, striking the end of the spring-bolt M', causes it to automatically release the ring $K^3$ and allow the bolts to be shot into their locked position.

When it is desired to set the automatic locking device, the door being open, the handle is inserted in the socket $l^2$ of the shaft $l$ and turned until the lever L' engages the hooked end of the trip-lever $n$ of the time-lock N, the teeth upon the lever L at the same time engaging the teeth $k^3$ upon the ring K and rotating it so as to compress the springs $k^2$ and retract the projections $k$ from contact with the bell-cranks J. By this movement of the parts, the spring-bolts $k'$, which are preferably simple straight bolts inclosed in a casing secured to the ring K and actuated by barreled springs, will be brought to bear upon the bell-cranks J ready to throw the bolts as soon as the ring $K^3$, which holds them, is released, as has heretofore been explained.

In Fig. 12 a different form of bolt-controlling mechanism is shown, double-barrel spring-bolts $K^4$ being used to operate the bolts. These bolts $K^4$ are secured to a sliding ring $K^5$, which is held in place and guided by screws $k^5$, working in slots $k^6$ in said ring $K^5$. One of each pair of bolts $K^4$ is adapted to bear upon projections secured to the inner surface of the male screw-ring F and withdraw the bolts by bringing the projections $k^7$ on the sliding ring $K^5$ into engagement with the bell-crank J. The other bolts of each pair are adapted to bear directly upon the bell-crank J at the proper time to throw the bolts in their locked positions.

In Figs. 14, 15, and 19 a different form of bolt proper is shown. In this instance the form is that of a latch $I^2$. This latch $I^2$ is made in the general form of a bell-crank lever and is pivoted in a suitable recess in the male screw-ring at $i$ by a screw-bolt $i'$, preferably having a head with a large bearing-surface and a smooth bearing portion passing through the latch and having a screw-threaded end screwing into the body of the male screw-ring F. In using this latch $I^2$ the bell-crank is dispensed with and the bolt-controlling mechanism operates directly against the inner end $I^3$ of the said latch to throw the other end $I^4$ in or out to lock or unlock the door. The end $I^3$ of the latch $I^2$ is provided with a projection $i^2$, similar to the projections $j^3$ upon the bell-crank J, which like said projections $j^3$ work in slots in the sliding ring $K^3$, as hereinbefore described. The end $I^4$ of the latch $I^2$ is provided with a screw $i^3$, by the adjustment of which any wear of the end $I^4$ of the latch may be compensated for. This construction is clearly shown in Figs. 15 and 19. The specific means shown at the end of latch $I^2$ for wear-compensation adjustment are not essential and they may be dispensed with, and any known practical wear-compensating adjusting means may be adopted without departing from my claimed invention.

The rear cap-plate M is screwed to the rear face of the male screw-ring F and covers all the operating mechanism within said ring. The cap-plate M is provided with a door $M^2$, by opening which access can be had to the time-lock N when it is desired to set the same. In the use of circular doors for safes where they are pivoted to swinging hinges, as in the present invention, it is very desirable to have a door-retaining device to hold the door in position to be swung into place without injuring or mutilating the door-jambs by striking upon their edges. In carrying out this part of my invention I have provided a spring-bolt O, upon the inside of the hinge D, the end of which is adapted to engage a depression $o$ in the periphery of the ring E, carrying the circular door C, and hold it in proper position to be swung into the doorway without striking the edges of the jambs.

The bolt O (shown in Fig. 16) is adapted to slide in a bearing in the web of the hinge D at one end, and in a bearing secured to the inner face of the hinge D at the other. Attached to the bolt is a lever $o'$, provided at its free end with a small antifriction-roller $o^2$, and at its other end with a cam-face $o^3$, working against a cam-face $o^4$ upon the webbing of the hinge D. A coil-spring $o^5$, having one end engaging the bearing on the inner face of the hinge D, and the other end engaging the lever $o'$, normally tends to keep the lever as far from the hinge D as the shoulders upon the cam-faces $o^3 o^4$ will permit, as well as serving to hold the bolt O in engagement with the depression $o$.

When the door is swung shut just after the shoulders of the door begin to telescope with the jambs of the doorway the roller $o^2$ strikes the front of the safe A and forces that end of the lever $o'$ back, thus operating the cam-faces to force the bolt back out of engagement with the depression $o$ and allow the door to be closed snugly.

Figs. 17 and 18 show a different form of the device shown in Fig. 16 employing a rock-shaft $O'$, having suitable bearings upon the hinge D, and provided at one end with an operating-lever $O^2$, having an antifriction-roller, similar to lever $o'$ in Fig. 16. The other end of the rock-shaft $O'$ has bifurcated projections extending on either side of the bolt and engaging projections $o^6$ upon the bolt to retract it when the door it closed. The coiled spring $o^7$ normally keeps the bolt in engagement with the depression $o$ in the ring E of the door.

As shown in Figs. 1 and 2, a combination-lock P may be secured to the front cap-plate $E^2$, as an additional lock against the rotation of the safe-door, its bolt $p$ when thrown into its locked position engaging the lug or projection $p'$, secured to the ring $C^2$ upon the front of the door C. It will be seen that when the combination-lock is also used, after the time-lock has been tripped and automatically withdrawn the locking-bolts, it is still necessary to unlock the combination-lock P before the door C can be rotated and opened.

In constructing my safe in the foregoing manner, it will be noticed that very simple mechanism is used and great compactness secured, while enormous strength is developed in every part where it is required. In constructing the circular door with a series of shoulders for a part of its thickness and a plurality of screw-segments for the remainder of its thickness, it can be closed with such a powerful and snug joint that it cannot be forced or explosives of any kind be introduced. This is of course the case to a much greater degree when the screw-segments are arranged in series. Where only one screw-thread segment is depended upon, there is very little security and hence it is very important to so construct the door that a plurality of segments, and a plurality of step-shoulders, arranged in the relative juxtaposition shown in my drawings, may be employed. It is also very desirable that the named elements for producing the tight joint may be included within the thickness of the door substantially as I have shown, as great compactness and strength are thus secured.

There is great advantage attained also by the construction of the bolting mechanism. The bolts besides being most effective in their prevention of any rotation of the door are so operated that should any obstruction accidentally get into the safe to prevent them from being shot into proper locking position, this will not cause a lock-out, for it is not necessary for the bolt to make its full throw before it can be withdrawn.

It will be observed that the automatic locking mechanism is entirely inaccessible from the front of the door, as there are no spindle holes or perforations from the front to the rear of the door at any point. In every respect therefore safes equipped with my invention are adapted to withstand attacks of every kind most effectively.

It should be understood that the female and male screw-threads are cut in the wall inclosing the doorway of the safe and on the periphery of that portion of the door which enters and occupies said doorway, by continuous operations of the tools on spiral or screw lines; and that the spiral groove thus formed partakes of a screw formation from beginning to end, and that the longitudinal channels, which are formed subsequently, mutilate the said male and female screws so that a series of segmental sections of screw-threads are produced; or, in other words, I form all of the segmental sections by the spiral cutting and the straight channeling tools, and hence my segmental sections differ entirely from that type of lug which is inclined on one face and rides externally against another inclined face. My spiral segmental sections of screw-thread all come within the doorway, and the female threads firmly support the male threads at front and in rear, and every segmental male thread of the series of segments is thus supported by the female screw-sections, and my entire construction is such that the interlocking segmental screw-threads do not project into the chamber of the safe beyond the inner extremity of the door or any adjunct at said end.

What I claim is—

1. A safe having a circular opening provided with a series of shoulders for a part of its thickness and a plurality of screw-segments, forming a mutilated female screw for the remainder of its thickness, and a circular door, the periphery of which is provided for a part of its width with a series of shoulders, and for the remainder of its width with a plurality of screw-segments, forming a mutilated male screw, substantially as described.

2. A safe provided with a circular opening having included within its thickness a series of stepped shoulders, and a plurality of screw-segments forming a mutilated female screw, a circular door the periphery of which includes within its width a series of stepped shoulders and a plurality of screw-segments, forming a mutilated male screw, the stepped shoulders of the door being adapted to be seated against the stepped shoulders of the circular opening, and the segments of the male screw, being adapted to engage the segments of the female screw, upon a partial rotation of the door, to form a close and strong joint, a flanged ring for carrying the circular door and yet permit of its being rotated, a hinge for carrying said ring and door and means for rotating the door, substantially as described.

3. A safe provided with a circular opening having shoulders and a mutilated female screw provided with beveled interrupted portions, a circular door having corresponding shoulder and a mutilated male screw, provided with beveled interrupted portions, whereby the closing and opening of the door are facilitated, substantially as described.

4. The combination with a safe having a circular opening, and a circular door adapted to be rotated, of an automatic bolt locking mechanism inclosed within said door, comprising locking-bolts adapted to move in or out, to lock or unlock the door, a primary sliding ring provided with projections and spring-actuating bolts to operate the locking-bolts means for controlling said primary sliding ring connected with a time-lock, a time-lock within said circular door, a secondary sliding ring adapted to control the locking-bolts when in their withdrawn position, and means for controlling the secondary sliding ring, substantially as described.

5. A safe having a circular opening, provided with stepped shoulders and a mutilated female screw, a circular door provided with stepped shoulders and a mutilated male screw, adapted to engage the shoulders and female screw of the circular opening, upon a partial rotation of the said door, an automatic bolt locking mechanism inclosed within said door, comprising locking-bolts adapted to move in or out, to lock or unlock the door against rotation, a primary sliding ring provided with projections and spring-actuating bolts to operate the locking-bolts, means for controlling the said primary sliding ring, a time-lock, operating said means, a secondary sliding ring adapted to control the locking-bolts when in their withdrawn position, a spring-puppet for controlling the said secondary sliding ring, and a projection upon the inner surface of the safe for operating the spring-puppet, substantially as described.

6. The combination with a safe having a circular opening, of a mutilated female screw in said opening, a circular door provided with a mutilated male screw, locking-bolts adapted to be thrown in or out, in the interrupted portions of the mutilated male screw and having an end engagement with the screw-segments of the mutilated female screw, whereby the said door is locked against rotation, and means for controlling said locking-bolts, substantially as described.

7. The combination with a safe having a circular opening, of a circular door provided with locking-bolts, a bolt-controlling mechanism, comprising a sliding ring adapted to engage the inner ends of the locking-bolts for operating them, projections secured to said sliding ring, coiled springs interposed between said projections, and projections upon the circular door to actuate said sliding ring to withdraw the locking-bolts, means for controlling said sliding ring, and means for controlling the locking-bolts when in their withdrawn position, substantially as described.

8. The combination with a safe having a circular opening, of a circular door, provided with locking-bolts, a sliding ring adapted to control the locking-bolts, springs for actuating the said sliding ring, projections upon the sliding ring, a controlling-lever engaging said projections, a lever pivoted to the door engaging a time-lock and having a slotted connection with the said controlling-lever, whereby the bolting mechanism may be set or tripped as desired, and means for controlling the bolts in their withdrawn position, substantially as described.

9. The combination of a safe having a suitable door-opening, of a suitable door, a hinge pivotally carrying said door, a spring retaining-bolt adapted to engage the door to guide it into its closed position without danger of injury to the door-opening or the door, substantially as described.

10. The combination of a safe having a suitable door-opening, of a suitable door, a hinge pivotally carrying said door, a retaining-bolt sliding in bearings on said hinge and engaging a depression in the door for guiding it into its closed position, a spring for normally holding the retaining-bolt in engagement with the said depression, and an arm adapted to strike the front of the safe when the door is nearly closed for retracting the retaining-bolt, substantially as described.

11. The combination of a safe having a circular opening, of a circular door, a carrying-ring, a hinge for carrying said ring and door, a spring retaining-bolt adapted to engage a depression in said ring, an arm secured to said bolt and provided at one end with an antifriction-roller, and at the other with a cam-face, a cam-face upon the hinge, adapted to engage the cam-face upon the arm, for retracting the retaining-bolt when the arm is operated by coming in contact with the safe-front the door being almost closed, the construction being such that the door is guided into its closed position and then released without injuring the parts, substantially as described.

12. In a safe, the combination of a wall of the same having a circular opening, a circular door adapted to partially rotate, bolting mechanism, and a time-lock mechanism inclosed within said door, a ring for carrying the door so that it can rotate, a hinge upon the safe-wall for carrying the ring and door, a cap-plate upon the face of the carrying-ring, lugs upon the face of the door, and corresponding lugs upon the cap-plate adapted to be engaged by the said lugs on the door when in its locked position, to more securely hold said cap-plate in place, a combination-lock mounted upon the cap-plate, and a projection upon the door adapted to be engaged by the bolt of the combination-lock when in its locked position, for preventing the rotation of the door when the interior bolting mechanism has been unlocked by the time-lock, substantially as described.

In testimony whereof I hereunto affix my signature in presence of two witnesses.

THOMAS M. BRINTNALL.

Witnesses:
W. C. STERLING,
H. C. BRADLEY.